United States Patent [19]
Waltrip

[11] 3,896,850
[45] July 29, 1975

[54] CHECK VALVE AND LEAK INDICATOR

[76] Inventor: Hobart Waltrip, 3444 Bonnie Lea Ct., Louisville, Ky. 40216

[22] Filed: July 16, 1973

[21] Appl. No.: 379,803

[52] U.S. Cl. .................. 137/554; 137/540; 251/366
[51] Int. Cl. ............................................ F16k 21/04
[58] Field of Search ............ 137/538, 554; 251/324, 251/366

[56] References Cited
UNITED STATES PATENTS

| | | | |
|---|---|---|---|
| 860,820 | 7/1907 | Norton | 137/538 |
| 1,933,905 | 11/1933 | Hawks | 137/538 X |
| 2,164,669 | 7/1939 | Thomas | 137/538 X |
| 2,638,582 | 5/1953 | Urso et al. | 137/553 X |
| 2,942,572 | 6/1960 | Pall | 116/117 R |
| 3,080,885 | 3/1963 | Webster et al. | 137/538 X |
| 3,103,950 | 9/1963 | Gulick | 137/538 X |
| 3,140,690 | 7/1964 | Siebel | 116/70 |
| 3,154,049 | 10/1964 | Smith et al. | 116/117 R X |
| 3,326,087 | 6/1967 | Gohlke et al. | 137/554 X |
| 3,439,706 | 4/1969 | Barrett | 137/554 |
| 3,490,736 | 1/1970 | Snyder | 251/366 X |
| 3,542,062 | 11/1970 | Zahid et al. | 137/538 X |
| 3,626,474 | 12/1971 | Hammer | 137/554 |
| 3,664,305 | 5/1972 | Hart et al. | 251/324 X |

*Primary Examiner*—Henry T. Klinksiek
*Attorney, Agent, or Firm*—Wm. R. Price

[57] ABSTRACT

Discloses a check valve and a leak indicator for indicating the position of a valve closure means relative to spaced apart inlet and outlet ports. The invention involves the use of an elongated cylindrical valve chamber and a spring loaded valve closure mounted therein for reciprocating movement between the inlet and outlet ports, so as to require maximum axial movement to open the outlet port. Magnetic indicating means situated outside the valve housing and outside the valve chamber are completely isolated and separated from the fluids in the valve chamber, and move responsive to the axial movement of the reciprocating valve closure to indicate the smallest leak.

1 Claim, 5 Drawing Figures

PATENTED JUL 29 1975 3,896,850
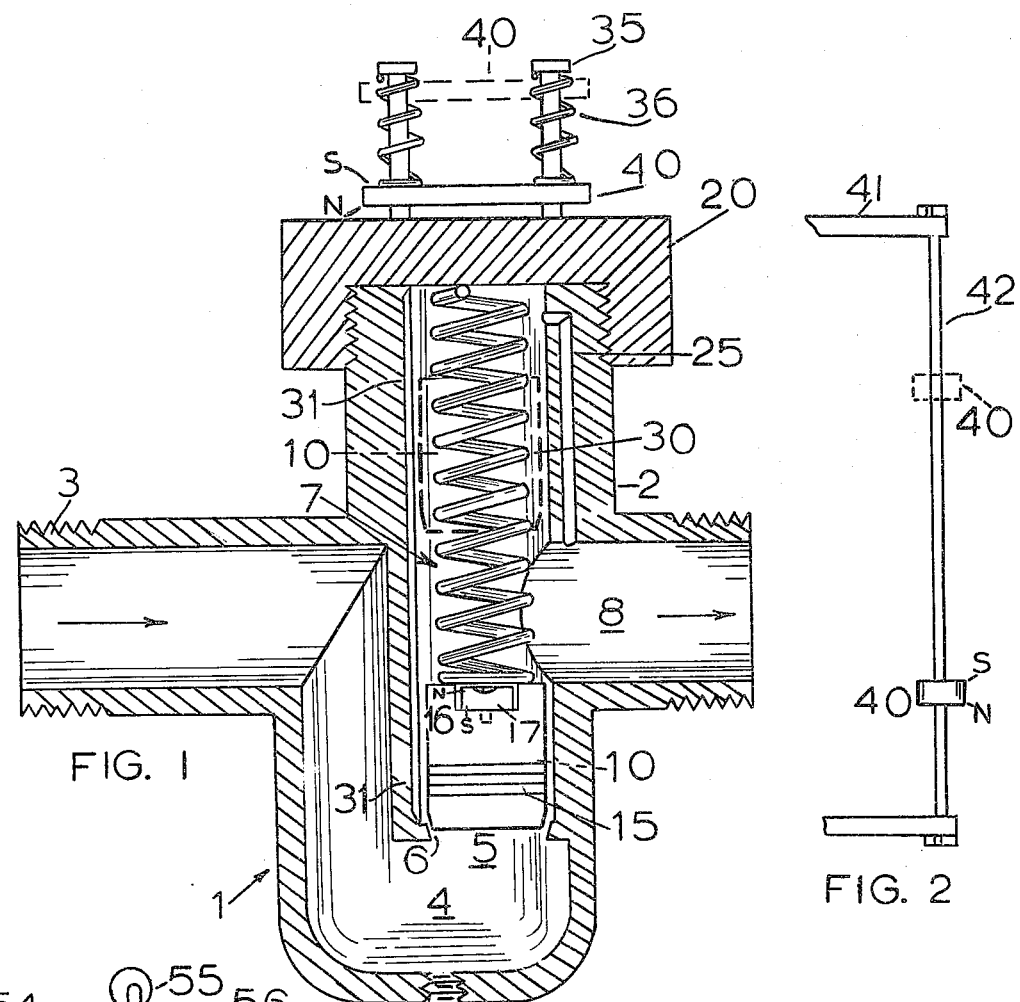
FIG. 1
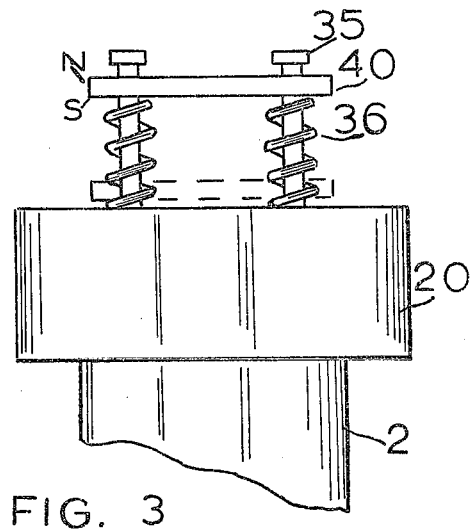
FIG. 2
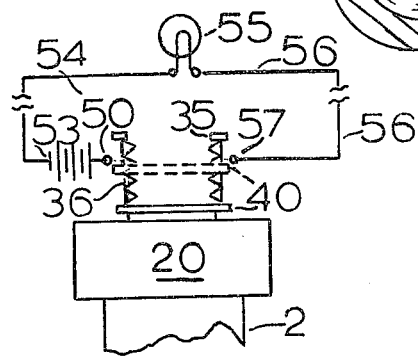
FIG. 4
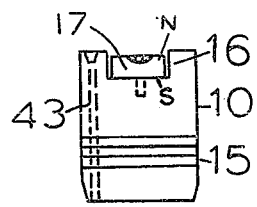
FIG. 5
FIG. 3

CHECK VALVE AND LEAK INDICATOR

FIELD OF THE INVENTION

This invention relates to valves and specifically to check valves. More specifically, this invention relates to leak indicators used in conjunction with specially designed valves which are completely isolated and separated from the valve chamber itself.

BACKGROUND OF THE INVENTION

According to the prior art, check valves have been primarily of the lift check, or gate check, variety. Such valves are disclosed, for example, in U.S. Pat. No. 2,029,633 to Muhleisen and in U.S. Pat. No. 3,085,432 to Bloom. Each of these inventors have disclosed indicating means which would indicate when the check valve was open or closed. The problem, however, has been in the fact that the movement of the valve gate was so slight that a small leak would go undetected since the movement of the leak indicating means would be scarcely noticeable. Further, any of the proposals of an indicating means for use with valves require the use of a packing gland or seal, and thus the leak indicating means itself became another source of leaks. Various other parties have proposed the use of magnetic indicating means to indicate a pressure differential between two pressure lines in which the indicating means was completely separated from the high pressure and low pressure fluid lines. Such methods, for example, have been proposed by Pall in U.S. Pat. No. 2,942,572; Smith, in U.S. Pat. No. 3,154,049; Topol in U.S. Pat. No. 3,412,706; Seibel in U.S. Pat. No. 3,140,690; and by Mouwen in U.S. Pat. No. 3,364,897. However, none of these mechanisms have been applied to use with a valve which is used to open, close or control the flow of fluid through a line. In each of these cases, the magnetic pressure differential indicators were used merely to indicate the difference in pressure between a high pressure line, for example, on one side of a filter, and a low pressure line on the other side of the filter and acted to indicate when the pressure drop was such that the filter was about to become clogged. The only patent known by Applicant utilizing a magnetic indicating means relative to a check valve is the patent to Urso, et al., U.S. Pat. No. 2,638,582. Urso et al allow for the flow of grease or lubricant through a valve opening thence around the shaft of the valve closure means and finally through a magnetic means to an outlet port. According to this invention, however, the lubricant would begin to flow immediately upon unseating of the valve closure means, thus again allowing a leak in the line without a noticeable indication by the complementary magnetic sleeve located outside the valve housing.

SUMMARY OF THE INVENTION

According to this invention, an elongated valve chamber is provided, equipped with an axially reciprocating plug closure means adapted for maximum axial movement between full seated position and full open position. To accomplish this end, the valve closure is equipped in one embodiment with a set of compression rings so as to eliminate or to minimize any leakage after the plug closure means is unseated and until the plug reaches the level of the outlet port. Even at that point there is not full flow of fluid through the valve until the closure means rests at a point past the outlet port. The indication of the position of the valve closure means is through the use of a magnet mounted to the top of the valve closure means and which is in the magnetic field of a magnetic indicant slidably mounted outside said valve housing so as to be responsive to the axial movement of said valve closure and magnet. Due to the fact that the valve closure means must move axially the entire distance between the inlet port to the level of the outlet port before any flow is allowed, the magnetic indicant located outside the valve chamber is immediately noticeable so that even minor leaks are instantly detected. In one modification, the magnetic indication means is through the mechanism of magnetic repulsion. In still another modification, the leak indicating means involves the use of a switch comprising two electrical contacts in an electric circuit which contacts are bridged or closed by said magnetic indicant to complete said circuit and energize a remotely located alarm or light.

BRIEF DESCRIPTION OF THE DRAWINGS

Referring now to the drawings,

FIG. 1 is a sectional view with parts in elevation of the valve of this invention illustrating the valve closure in seated position in full lines and in open position in dotted lines.

FIG. 2 is a modification of the magnetic indicant mounted in juxtaposition to said valve closure.

FIG. 3 is a modification of the magnetic indicant of FIG. 1 mounted in axial alignment with said valve closure but biased away from said valve closure by compression springs.

FIG. 4 is a diagrammatic illustration of the use of the magnetic indicant as a switch to act as a remotedly located leak indicator.

FIG. 5 is an elevational view of the cylindrical plug closure means of this invention and illustrating in phantom lines an axially aligned dampening passage.

DESCRIPTION OF THE PREFERRED EMBODIMENT

Referring now to the drawings, the valve generally is indicated by 1. Numeral 2 indicates a housing which has a threaded feed connection 3 leading to the first chamber 4. The inlet port 5 of the valve chamber 7 is surrounded by an annular valve seat 6. The outlet port 8, it will be noted, is located in spaced relation to the inlet port 5 and extends through the side wall of the valve housing 2. The valve closure means 10 which is a cylindrical plug contains a frustoconical truncated portion at its bottom end which registers with the annular valve seat 6. A set of compression rings 15 (fitted in annular grooves not shown) act to completely seal the lower portion of the valve chamber 7 until the valve closure 10 reaches the lower level of the outlet port 8. When the valve closure plug is in the position as shown in phantom lines past the outlet port 8, there is a full flow of fluid through the valve. The top of the valve closure contains a depression 16 in which a first magnet 17 is mounted with the north pole toward the top and the south pole toward the bottom. A spring 30 biased against cap 20 and the top of the plug 10 pushes the valve closure into seated engagement against the annular valve seat 6 at the inlet port 5. In order to allow liquid in the top of the valve chamber 7 to be displaced as the valve closure 10 is forced upwardly, an equalizing passage 25 extends from the upper portion of the valve chamber 7 to the outlet port 8. It will be noted that a second magnet 40 which serves as a magnetic indicant is mounted on two posts 35 atop the cap 20 of the valve housing. This magnet is urged downwardly toward the valve closure means by means of two springs 36 surrounding the supporting posts 35. Since the like pole of the first magnet 17 is disposed toward the like pole of the second magnetic indicant 40, the second magnet 40 is pushed upwardly by magnetic repulsion as the closure member 10 moves toward the top portion of the valve chamber 7. As previously indicated, since the compression rings 15 snugly fit against the wall of the valve chamber 7, the closure member 10 must move almost its entire length before there is any flow of fluid through the valve whatsoever. Accordingly, a minor leak such as often occurs is immediately indicated by movement of the magnetic member 40 upwardly against the biasing pressure of spring 36.

A modification of this approach utilizing magnetic attraction rather than magnetic repulsion is illustrated in FIG. 2. In this case, the magnet 40 is mounted slidably on a shaft 42 supported by two brackets 41 attached to the valve housing 2 at a point not shown. Thus, as is diagrammatically illustrated, as the valve closure 10 moves upwardly, the magnet 40 moves along with its corresponding magnet 17 to indicate the exact location of the top of the valve closure 10 at all times. In another modification, utilizing magnetic attraction rather than magnetic repulsion, the magnet 40 is slidably mounted on the post 35 atop the cap 20 of the valve housing and is biased away from the valve closure by means of two springs 36. In this instance, the unlike pole of magnet 40 was disposed toward the unlike pole of magnet 17 mounted on the valve closure 10 so that as the valve closure 10 moves upwardly toward the upper portion of the valve chamber 7, magnetic attraction of the two magnets 17 and 40 respectively pulls the second magnet 40 down against the biasing pressure of springs 36 to indicate that the valve closure is in movement along the valve chamber and that the valve is partially or fully open.

FIG. 4 illustrates a modification in which the magnetic indicant 40 is utilized as a switch across electrical contacts 50 and 57 of the diagrammatically illustrated electrical circuit. In this case, when the magnet 40 comes into contact with contacts 50 and 57, current can then flow from battery 53 to line 54 to light 55 located in an operator's room and through line 56 to contact 57 to thus close the circuit. As the valve closure 10 moves downwardly, the magnet 40 pulls away from the electrical contacts 50 and 57 to break the circuit and thus turn off the leak indicating light 55.

In order to dampen the movement of the valve closure within the valve chamber 7, there is provided in FIG. 1 a dampening groove 31 which runs axially the entire length of the valve chamber 7. Thus, fluid can flow along this axial groove 31 allowing a freer and easier movement of the valve plug 10 along the valve chamber. In another embodiment of a dampening means illustrated in FIG. 5, there is provided a dampening passage 43 shown in phantom lines axially aligned through the body of the closure member 10. An advantage of the dampening passage 43 is that an orifice plug can be used to close the passage if it is not needed. However, a disadvantage is the propensity of such small diameter passageways to become plugged with dirt or other debris.

It will be obvious to those skilled in the art that, if, for example, the magnetic indicant moves against a calibrated background and that the pressure of the inlet line 3 is known and the pressure of the outlet line 8 is known, that this device can be used as a flow meter. However, it is chiefly felt that the use of the valve of this invention and that the use of the leak indicating means of this invention will be primarily of benefit as a check valve and particularly to indicate small leaks in lines in which such leaks were never before easily detectible. Many modifications will occur to those persons skilled in the art from the description hereinabove given, which is meant to be illustrative in nature and non-limiting except so as to be commensurate in scope with the appended claims.

I claim:
1. A high pressure steam valve including
    A. a valve body comprising:
        1. an elongated valve chamber, including:
            a. an inlet port at one end of said chamber,
                1. an annular valve seat surrounding said inlet port
            b. an outlet port opening in the side wall of said valve chamber at a point in spaced relation to said inlet port and extending through the side wall of said valve body,
    B. an elongated valve closure in the form of a cylindrical plug, and a circular compression ring surrounding said cylindrical plug, said cylindrical plug being fitted in said valve chamber for axial reciprocating movement in said chamber between
        1. full closed position seated against said annular valve seat
        2. full open position at a point past said outlet port,
        3. a leaking position wherein said compression ring surrounding said cylindrical plug is past the level of the lowest part of said outlet port thereby allowing a small leak to occur, and at
        4. intermediate points therebetween
    C. a spring, mounted in said valve chamber and biased at the top against the top of said valve chamber and at the bottom against said cylindrical plug for urging said cylindrical plug toward said full closed position,
    D. the further combination therewith of indicator means responsive to the axial movement of said cylindrical plug to indicate the position of said cylindrical plug and visibly indicate the position of said cylindrical plug at said leaking position.

* * * * *